(12) United States Patent
Balcom et al.

(10) Patent No.: US 9,186,844 B2
(45) Date of Patent: Nov. 17, 2015

(54) METHOD FOR FORMING AN EDGE PROTECTION ELEMENT ON A GLASS ARTICLE

(75) Inventors: Robin S Balcom, Corning, NY (US); Douglas Miles Noni, Jr., Horseheads, NY (US)

(73) Assignee: Corning Incorporated, Corning, NY (US)

( * ) Notice: Subject to any disclaimer, the term of this patent is extended or adjusted under 35 U.S.C. 154(b) by 307 days.

(21) Appl. No.: 13/563,006

(22) Filed: Jul. 31, 2012

(65) Prior Publication Data

US 2014/0035204 A1 Feb. 6, 2014

Related U.S. Application Data

(60) Provisional application No. 61/529,511, filed on Aug. 31, 2011.

(51) Int. Cl.
*B32B 37/12* (2006.01)
*B29C 63/00* (2006.01)

(52) U.S. Cl.
CPC .................................. *B29C 63/0026* (2013.01)

(58) Field of Classification Search
CPC ................................................... B29C 63/0026
USPC ........................................................ 264/261, 496
See application file for complete search history.

(56) References Cited

U.S. PATENT DOCUMENTS

| | | | | |
|---|---|---|---|---|
| 5,069,852 | A | * | 12/1991 | Leone et al. .................. 264/239 |
| 5,464,575 | A | * | 11/1995 | Jaffiol et al. .................. 264/443 |
| 5,620,648 | A | * | 4/1997 | Volkmann et al. ............ 264/511 |
| 2010/0221501 | A1 | | 9/2010 | Chen et al. |
| 2010/0285260 | A1 | | 11/2010 | Bookbinder et al. |
| 2010/0285277 | A1 | | 11/2010 | Edwards et al. |

* cited by examiner

*Primary Examiner* — Yogendra Gupta
*Assistant Examiner* — Kimberly A Stewart
(74) *Attorney, Agent, or Firm* — John T. Haran

(57) ABSTRACT

The disclosure is directed to methods of forming edge protection on glass and in particular on glass that has been chemically strengthened by ion exchange. In one embodiment an edge protection or bumper is placed about the glass's edge(s) in a manner such that it does not cover the face(s) of the glass, and the bumper and glass are such that a cavity is formed between the glass edge(s) and the bumper. An adhesive is injected into the cavity, the air in the cavity is vented, and the adhesive is cured to firmly attach the bumper to the glass edge(s). In another embodiment a mold is placed about the glass edge(s), and the mold and glass edge(s) are such that a cavity is formed between the glass edge(s) and the mold. A polymer-forming fluid is injected into the cavity and then cured. The mold is then removed.

10 Claims, 4 Drawing Sheets

Figure 1a
Figure 1b
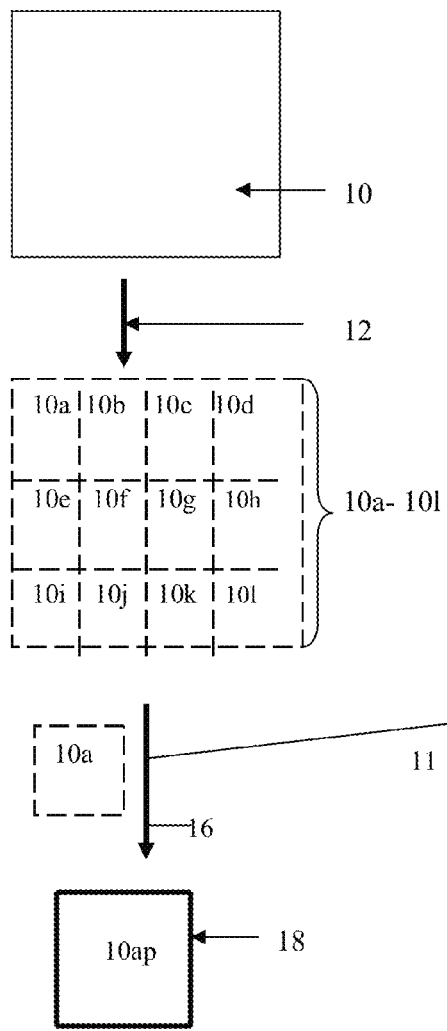
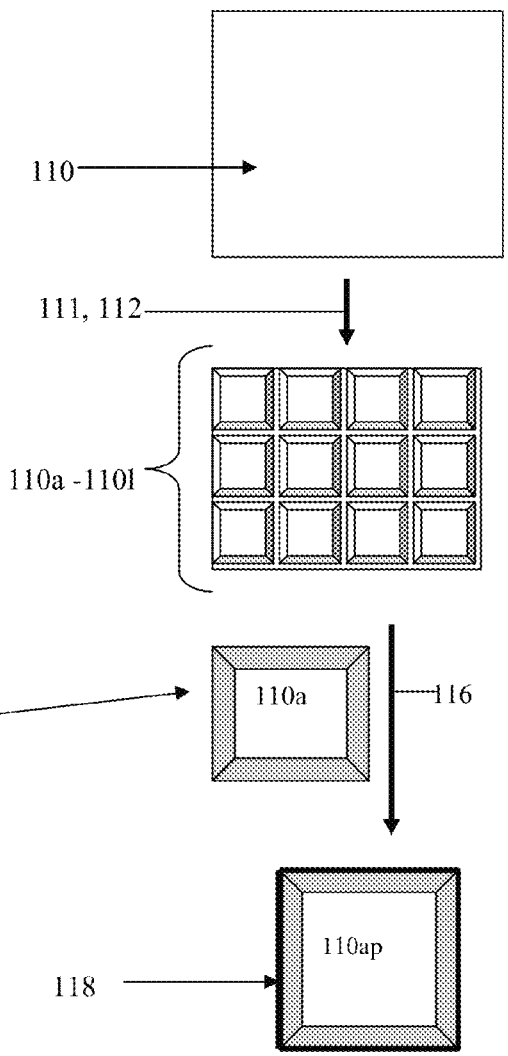

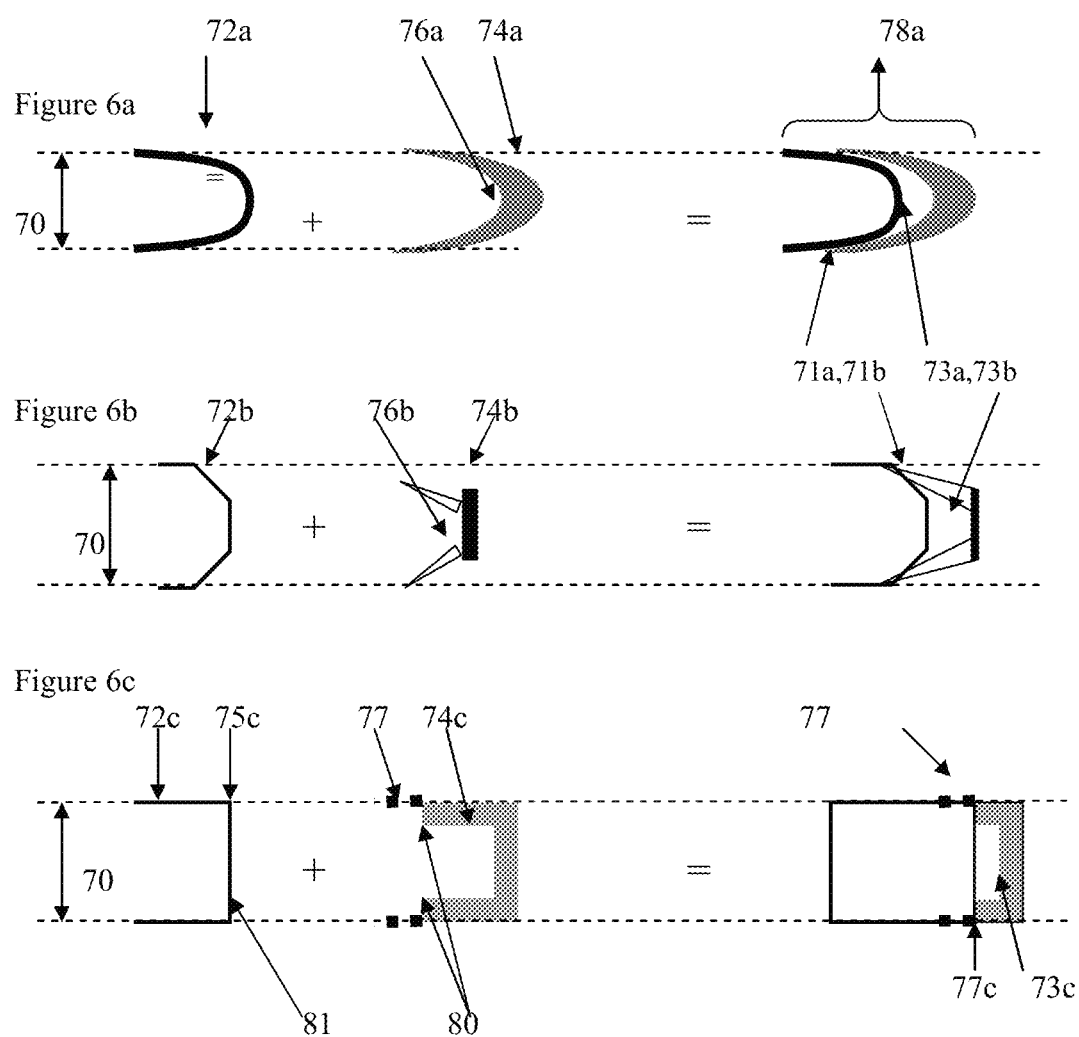

METHOD FOR FORMING AN EDGE PROTECTION ELEMENT ON A GLASS ARTICLE

This application claims the benefit of priority under 35 U.S.C. §119 of U.S. Provisional Application Ser. No. 61/529,511 filed on Aug. 31, 2011 the content of which is relied upon and incorporated herein by reference in its entirety.

FIELD

The disclosure is directed to providing protection against shock to the edge(s)s of glass articles and a method for making such articles and providing such protection. In particular the disclosure is directed to articles made from an ion-exchanged glass and providing polymeric edge protection material to the glass article's edges.

BACKGROUND

The disclosure relates to providing edge protection to a glass substrate that has been ion-exchanged ("IOX") at the mother sheet level and the mother sheet is either (1) (i) cut as-is into a plurality smaller glass articles for use as cover glasses or (ii) cut into a plurality of smaller glass articles followed by the application of electronic elements applied to the individual smaller glass articles to form fully integrated touch ("FIT") devices, or (2) electronic elements are applied to the ion-exchanged mother sheet followed by cutting the mother sheet having the electronic elements thereon to produce a plurality of identical FIT articles from a single mother sheet of glass.

FIG. 1a illustrates both items (1) (i) and (1) (ii) in the foregoing paragraph. For item (1) (i), a mother sheet 10 is cut (numeral 12) into a plurality of glass articles 10a-10l (illustrated) and edge protection is placed around the individual cut articles, for example article 10a, as indicated by the step of numeral 16, to form an edge protect article exemplified by 10ap (where "p" means the article is "edge protected") in which the edge protection is the heavy black line 18 circumscribing article 10ap. Alternatively, for (1) (ii), the individual glass article 10a can have electronic elements placed thereon as represented by the arrow of numeral 11 to form an individual article having electronic elements thereon as is represented by 110a in FIG. 1b. FIG. 1b illustrates approach (2), the "integrated" approach, in which a mother sheet 110 is subjected to a lithographic process to form a plurality of touch sensor elements 110a-110l on the sheet, and the sheet is then cut in step 112 to separate the individual integrated coverglass/touch-sensors such as the illustrated article 110a, and edge protection is placed around the individual cut articles, for example article 110a, as indicated by the step of numeral 116, to form an edge protect article exemplified by 110ap in which the edge protection is the heavy black line 118 circumscribing article 110ap.

Ion-exchanged glass has an outer surface area under compressive stress ("CS") that produces a central tension ("CT") area in the interior of the glass. The problem for cover glass articles or FIT articles made by the foregoing processes is that if the exposed CT area of the articles is impacted, the articles can crack for a distance from the impact area or, if the impact force is large enough, can shatter. Several techniques have been tried to strengthen the edge of the glass. One approach has been to acid etch the glass edges to gain strength. Other methods have been described in US Patent Application Publications 2010-0285260, 2010-285277 and 2010-0221501 which include protecting the glass edge(s) using polymer overmolding, a machinable metal armor layer laid over the edge(s), polymer tapes and liquid polymers, or a shaped fiber such as a glass fiber. However, each has proven unsatisfactory for varying reasons such as they were labor intensive, were not susceptible to automation, required additional processing steps which increased costs, or the edge protection material had to be molded over the edge onto the face of the article which is undesirable from aesthetic and tactile viewpoint. This disclosure presents a method that overcomes such deficiencies.

SUMMARY

In one aspect the disclosure is directed to a method of adhering an edge protection or bumper about the edge of a glass article, the method comprising providing a glass article having a first and second face and an edge; setting the glass article in a fixture; placing an edge protection material around the edge of the glass, the edge protection material being formed such that a cavity exists between the glass edge and the edge material; injecting an adhesive into the cavity between the edge of the glass and the edge protection material, and venting the air in the cavity; curing the adhesive to thereby bond the edge protection material to the glass edge; and removing the glass article having edge protection material bonded to it from the fixture. In one embodiment the adhesive is thermally cured. In another embodiment the adhesive is UV radiation cured.

In another aspect the disclosure is directed to a method of forming an edge protection or bumper about the edge of a glass article, the method comprising providing a glass article having a first and second face and an edge; setting the glass article in a fixture; placing an edge-forming mold around the edge of the glass, the edge-forming mold and glass edge being such that a cavity exists between the glass edge and the edge-forming mold; injecting an polymer-forming fluid into the cavity area between the edge of the glass and the edge forming mold, and venting the air in the cavity, curing the polymer material to thereby bond the polymer material to the glass edge as a bumper, removing the edge forming mold from the from the glass article, and removing the glass article having edge protection bonded it from the fixture. In one embodiment the edge-forming mold is coated with a mold release coating. In another embodiment the polymer-forming materials is thermally cured. In a further embodiment the polymer-forming materials is UV radiation cured.

BRIEF DESCRIPTION OF THE DRAWINGS

FIG. 1a is an illustration of the steps used to make, from an ion-exchanged mother sheet, either a cover glass with edge protection but no "touch" electronics or a "discrete" fully integrated touch ("FIT") consisting of a cover glass having edge protection and electronic thereon.

FIG. 1b is an illustration of the steps used to make from an ion-exchanged mother sheet upon which electronics are placed in order to make a fully integrated "touch"("FIT") article consisting of cover glass having a touch sensor formed on one face of the cover glass.

FIGS. 6a-6c provides an illustration of some of the glass edge shapes on which a bumper bonded or is formed using a mold.

DETAILED DESCRIPTION

Figure 2:
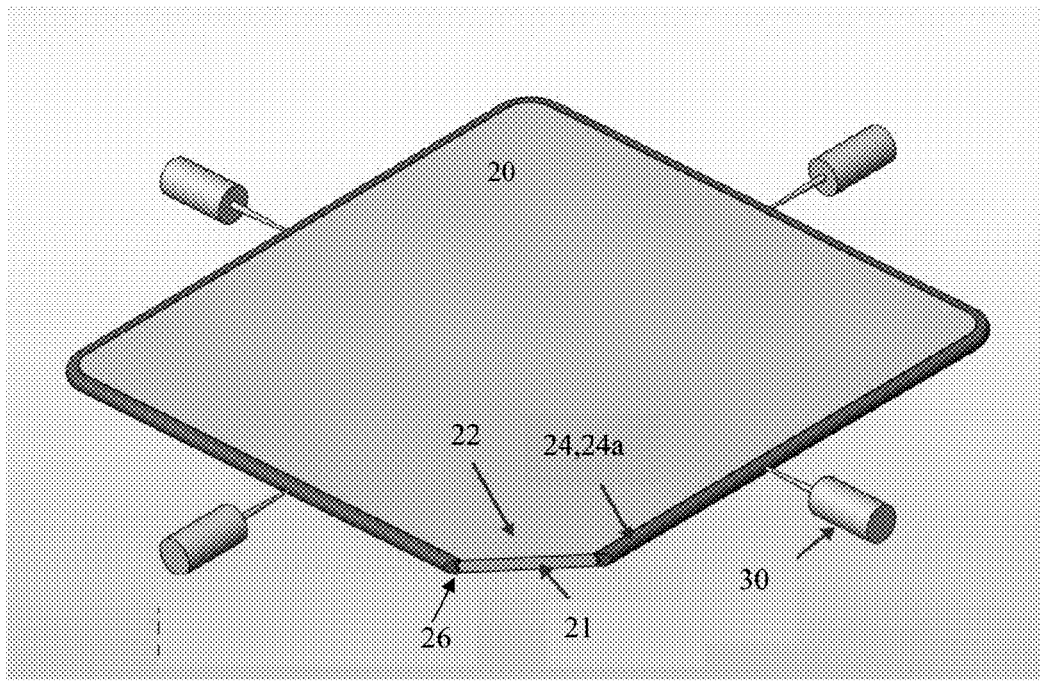
FIG. 2 is an illustration showing (1) the assembly of a glass article and an edge material that can be either (1) bonded to the glass edge by injection of an adhesive into a cavity between the glass edge and the edge material to form an edge protection element or bumper, or (2) can be used as a mold to form an edge protection element or bumper by injection of a polymeric material into a cavity between the glass edge and the edge material to form an edge protection element or bumper, the mold then being removed after the polymeric material is cured.

Herein the glass articles to which edge protection is applied have a length, width and thickness. The faces of a glass article is defined by the length and width, and the edge(s) of a glass article are defined by the thickness of the article. Also herein the term "edge(s)" may be used because the methods described herein are applicable to articles that have a single edge, for example a circular or ellipsoidal article, as well as articles that have a plurality of edges, for example without limitation, a square, rectangular, or hexagonally shaped articles. The methods described herein can be used with glass articles having any thickness. For example, in one embodiment the glass articles have thickness of greater than 5 mm. In another embodiment the glass articles have a thickness of less than 5 mm. In a further embodiment the glass article have a thickness in the range of 0.3 mm to less than 3 mm. In an addition embodiment the thickness is in the range of 0.5 mm to 1 mm.

The invention relates to ion-exchanged glass applications for consumer electronics, for example, cover glasses and fully integrated touch screens, and in particular to glass edge protection for such devices that are prone to dropping, for example, cell phones, small computers and electronic tablets. It has been determined that such devices will require a band or bumper of protection, the edge protection material, that buffers the glass from the bezel of the device to protect the edge(s) of the glass from shocks that can cause it to crack. In addition to complications earlier mentioned, the structure of cell phone and tablet systems structure is varied. For example, some have a gap as large as 0.5 mm gap between the bare glass and the bezel, and in others the bare glass is inset within the bezel itself. In order to fully protect a cover glass or a FIT article separate buffering materials is required between the glass and the bezel.

When considering methods of applying edge material having an adhesive already on it or applying an adhesive to the material just prior to placement on the glass article, it is apparent that there is a high probability that the adhesive will smear or become deposited on the glass face. This is undesirable for at least two reasons. The first is that smeared adhesive on either face of the device is aesthetically unacceptable, and that cleaning the surfaces will result in extra process steps, time and costs. The second is that customer electronics may be present on at least one side of the glass article and an adhesive may negatively impact the performance of the electronics.

In a first embodiment a method disclosed herein enables two articles, the glass and the bumper, to be assembled "dry," followed by the application of the adhesive in a controlled fashion to only the area required for adhesion or bonding of the bumper to a glass edge(s) by use of an injection device to place the adhesive between the glass edge(s) and the bumper. In a second embodiment a method disclosed herein enables the formation of a bumper around the edge(s) of the glass by the use of a removable "mold" or "form" about the edge(s) of an article, the application of a fluid, polymerizable polymeric material in the cavity between the mold and the glass edge, and curing the polymeric material to form a solid polymeric bumper around the edge(s) of the glass article. After curing the mold is removed. The foregoing methods both overcome the difficulties presently encountered in the industry in which the polymeric material is dispensed around the edge(s) of the glass, for example, using a pad, or the glass is dipped into the polymeric material. When such dispensing and dipping methods are used it is very difficult to get any appreciable thickness of the polymeric material on the edge(s) of the glass because of complexity of viscosity and gravity. Further, it is difficult to get a uniform polymer thickness using such methods. Typically to achieve any level of edge thickness, one would have to dispense or dip, cure and then repeat the procedure a plurality of time in order to "build-up" layers of material in order to achieve the desired bumper thickness. The advantage of the methods disclosed herein is that in the first embodiment the liquid polymer is injected between the glass and the bumper to bind the bumper to the glass without causing smearing of any polymeric material on the facial surfaces of the glass; and in the second embodiment the advantage is that once the fluid polymeric material has been injected between the mold and the glass article and cured, the mold can be released and the cured solid polymer remains on the on the glass as the protective edge material or bumper.

Figure 3:
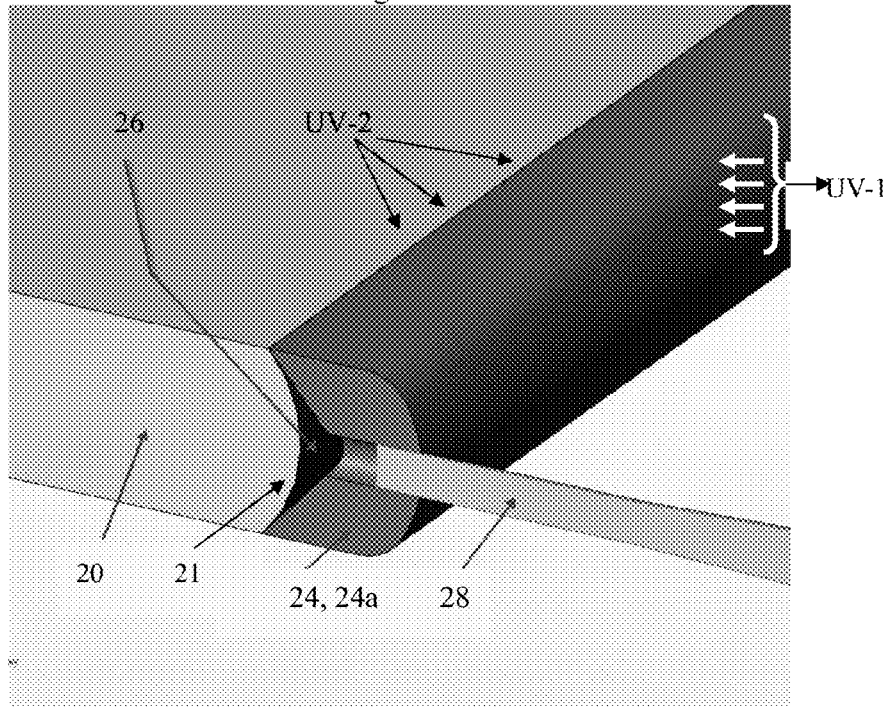
FIG. 3 is a detailed view of the injection site at which the adhesive or the polymer forming material is injected, with further illustration of the cavity between the glass edge and the bumper to be bonded or the mold used for in-situ formation of a bumper.

FIG. 2 is an illustration of the method showing glass 20, a section view cut of a corner 22 of the glass 20, the edge material that will either be bonded to glass edge 21 as bumper 24 or used as a mold 24a for forming the protective bumper, the location of the channel 26 between edge material 24,24a and glass edge 21, and an injection device 30 that is used for either injecting an adhesive into channel 26 to a bond bumper 24 to glass edge 21 or as a mold 24a for the injection of a fluid polymeric material into channel 26 to form, after curing, a bumper bonded to the glass edge 21. While in FIG. 2 only a single injection device is illustrated, a plurality of injection devices can be used along each edge, for example at the center and near the corners of each edge to insure that injected material is dispersed along the edge. FIG. 3 is an expanded view of corner 22 illustrating glass 20, edge 21, bumper 24/mold 24a, channel 26 formed by the glass edge 21 and the bumper 24 or mold 24a and the tip of injection device 28 positioned in channel 26 for injection of either an adhesive to bond bumper 24 to glass edge 21 or a curable polymeric fluid to form a bumper bonded to glass edge 21. When a bumper 24 is being bonded to glass edge 21, the selected bumper material is one that has a resiliency in order to absorb shocks if finished electronic device contained the protected glass is dropped. When a bumper is being formed by use of mold 24a, the mold material is selected from materials that will not bond to the cured polymeric material that is injected into channel 26 to form the resilient bumper in order to facilitate removal of the mold without damage to the formed bumper, and/or a release agent is applied to the mold material before use to facilitate removal of the mold. The polymeric materials used in conjunction with mold 24a can be thermally curable materials or UV curable materials. When the bumper 24 or mold 24a is made of a material transparent to UV radiation, UV curing can be carried out by either irradiating along the edge(s) through the bumper or mold as illustrated by UV-1 in FIG. 3 or by irradiating through the glass as illustrated by UV-2 so that the UV radiation can cure the adhesive or bumper-forming polymer in channel 26. If a bumper 24 or mold 24a is thermally stable at the temperatures required to either cure the adhesive that is used or the fluid, bumper-forming polymeric material, then thermal curing can be used provided that any electronic devices present on the article are not effected the thermal curing.

Figure 4:
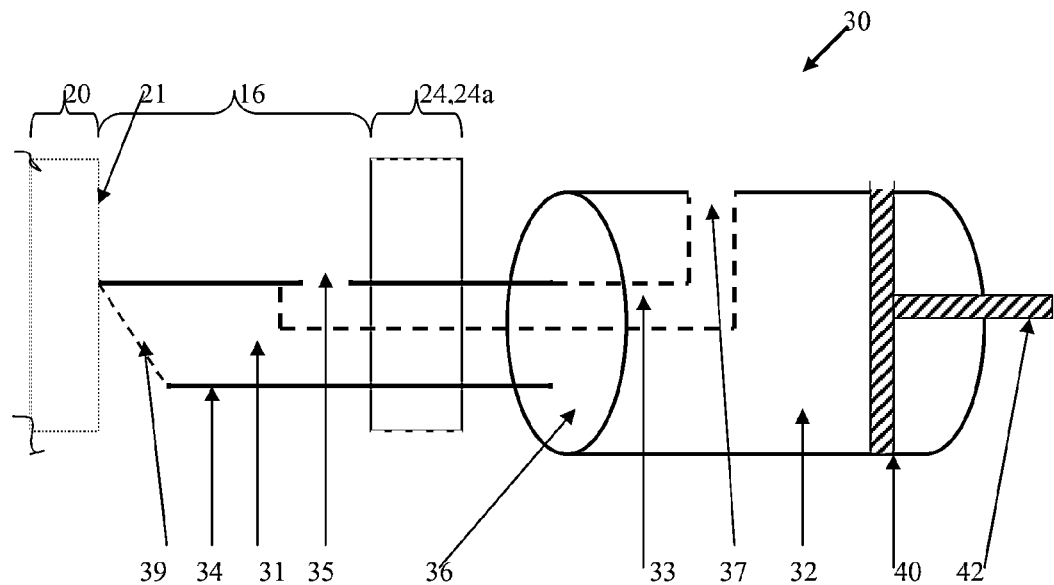
FIG. 4 is an illustration of the location of the glass edge, the injection device having a two-channel needle with openings for venting air in the channel between the glass edge and either a bumper to be bonded to the glass edge or a mold used to form a bumper adhered to the glass edge.

FIG. 4 is an illustration, not to any scale, of an embodiment of the injection device 30 and how the device 30 operates. Injection device 30 has a reservoir 32 containing the material to be injected, adhesive or material that will form a bumper and a needle 34 that passes through a face 36 of reservoir 32. The reservoir 32 also has a means for forcing the material within it through needle 34 opening 39, for example, a piston 40 having an attached drive shaft 42 that passes through a wall of reservoir 32. Additional elements required to operate and control the piston, for example controller and the driver for a piston, while not illustrated, are known in the art. Also illustrated in FIG. 4 is a section of a glass article 20 and edge 21, a bumper 24 or mold 24a as described above and the channel 26 between the glass edge 21 and bumper 24 or mold 24a. Needle 34 has within it a first channel 31 for passage of the material in reservoir to channel 16 and a second channel 33 for venting the air in channel 16 as channel 16 is filled with the material from the reservoir. When material is injected into channel 16 the air in channel 16 enters the needle's second channel 33 through opening 35 and is vented through opening 37. In use the needle 32 is positioned such that its tip and second channel opening 33 are both within channel 16 between the glass edge 21 and bumper 24 or/mold 24a.

Figure 5A:
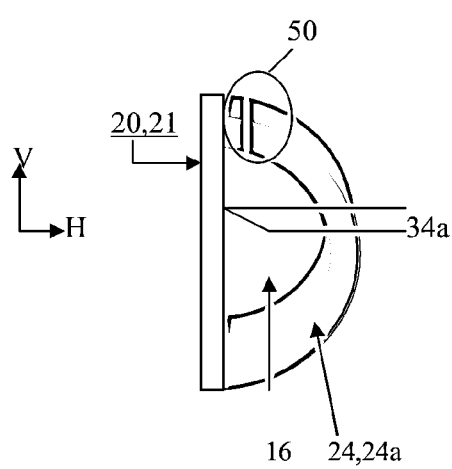
FIGS. 5a and 5b illustrate the use of use of an injection device having a single channel and the use of openings in a bumper that will be bonded to a glass edge or a mold that is used to form a bumper bonded to a glass edge.
Figure 5B:
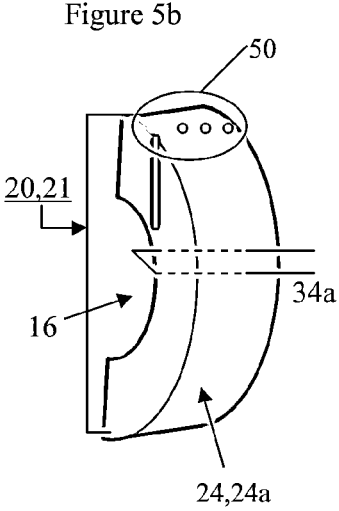

A second embodiment for allowing the venting of air in channel 16 is shown in FIGS. 5a and 5b in which the arrows on the far left labeled "V" and "H" indicate the vertical and horizontal axes, respectively, of both figures. FIG. 5b is an enlargement of the circled area 50 in FIG. 5a. In FIGS. 5a and 5b a single channel needle 34a having no vent opening penetrates the side of bumper 24 or mold 24a into the channel 16 between glass edge 21 and bumper 24 or mold 24a. Needle 34a is attached to a reservoir, not illustrated in FIGS. 5a and 5b, similar to that shown in FIG. 4 except that no vent opening is needed. The bumper 24 or mold 24a has a plurality of small openings 50 that pass through bumper or mold to provide for the venting of the air in channel 16 as the adhesive or polymer-forming material is injected into channel 16. When the material from the reservoir is injected through needle 34a into channel 16 the air in channel 16 is vented through the openings 50, and when it is observed that the material is flowing out of openings 50 the injection process is stopped.

FIGS. 6a-6b are is a side views of glass articles having at least one convex edge surface 72a or 72b for receiving a bumper 74a or mold 74b, respectively, that each have a concave surface 76a or 76b, respectively. The glass also has facial surfaces represented by the dashed line of numeral 70. When bumper 74a or mold 74b is fitted to the glass article for bonding to the glass using an adhesive or for use as a mold to form a bumper, the edge of the bumper 72a or mold 72b is at or slightly below the facial surface levels of the glass article so that the applied bumper or the bumper formed using mold does not cover any part of the surface of the glass or protrude above the surface of the glass. Numerals 71a and 71b illustrate the ends of the bumper 74a or mold 74b as being at or slightly below the surface 70 of the glass article Also illustrated in FIGS. 6a and 6b are the cavities 73a and 73b into which either the adhesive or the polymer-forming material is injected.

FIG. 6c is a side view of a glass article 72c having facial surfaces represented by the dashed line of numeral 70 and right angled edges 75c for receiving a bumper mold 74c that has an extension 77 (illustrated by the square blocks) that will fit over a portion of the surfaces 70 of the glass article and an edge 80 that fit against a portion of the glass article's edge surface 81. When the bumper mold 74c is fitted on the glass article 72c as shown at the right of the FIG. 6c, the extension 77 will cover a portion of the glass surfaces 70 for a distance from the edge 81 and the extension 77 will cover a small portion of the glass edge 81 for a small distance from the glass surface. This configuration will prevent any polymer-forming material from seeping under the mold onto the surfaces 70. When fitted together the mold 74c and glass 72c will form a cavity 73c into which a polymer-forming fluid can be injected to form a bumper adhering to the edge 81 of the glass 73c. While the mold 74c is illustrated as having a right angled interior, other interior surface shapes such as those illustrated in FIGS. 6a and 6b are possible. Such other interior surface shapes would extend inward from the flat surface 80 of mold 74c.

In one embodiment, hereafter Method A, the disclosure is directed to a method of forming edge protection around a glass article, the method having the steps of providing the glass article, setting the glass article in a fixture, placing an edge material around the edge(s) of the glass, injecting an adhesive into an area or cavity formed between the edge(s) of the glass and the edge material and venting the air in the cavity, curing the adhesive either thermally or using UV radiation to bond the edge material to the glass surface, and removing the edge protected glass article from the fixture.

In another embodiment, hereafter Method B, the disclosure is directed to a method of forming edge protection around a glass article, the method having the steps of providing the glass article; setting the glass article in a fixture; placing an edge protection mold around the edge(s) of the glass, the mold having a concave surface facing the edge(s) of the glass to be protected to thereby form a cavity wherein a fluid material can be injected; injecting a fluid polymeric material adhesive into the cavity between the edge(s) of the glass and the concave face of the mold; curing the injected polymeric material either thermally or using UV radiation; and removing the edge mold to expose newly formed polymer edge material or bumper adherent to the glass article edge.

In Method A one seeks to use an existing preformed, continuous rectangular solid rigid polymer edge material having no gaps or ends, and apply the material to the perimeter or edge(s) of a same shaped piece of glass. In order to bring the items together and fit well, the pre-formed edge protection must be the same size of the glass or slightly undersized so that it can be fitted and held in place. However, holding the materials in place by elastic forces is alone in not sufficient because any flaws in the material could cause it to rupture during use If the material is held in place by bonding it to the glass edge(s) using an adhesive such problems are avoided. However, if the adhesive is applied to either the edge protection material or the glass edge(s) it is highly probable that during assembly of the two pieces the adhesive will smear onto the top and/or bottom flat surfaces or the faces of the glass. This present disclosure allows the assembly of the edge protection to the glass "dry," that is, before an adhesive is applied to either the edge protection or glass. Once the two items are assembled dry, the adhesive is injected between the edge protection "inner surface" and the glass edge(s)' "outer surface". The adhesive can then be cured in place using UV radiation, heat or other curing process. When the assembly is complete and the curing has been completed, the adhesive is completely contained along the edge surface between the top and bottom surfaces of the glass. Regarding the injection process, in one embodiment the edge material can be made from a UV transparent material which enables the curing process through the edge protection. However, if the edge protection material is non-transparent, then the UV curing can be carried out through the glass. In one embodiment injected adhesive can be colored such that visual confirmation that the adhesive has completely filled the gap along the entire perimeter can be done prior to curing. Further, one can select an appropriate colorant for the adhesive so that after curing the adhesive has a selected color for aesthetic purposes, the color being the same as that of the applied adhesive or having been changed during the UV curing process to the desired color. One can similarly select an appropriate colorant when the adhesive will be thermally cured. The colorant could be selected to maintain its color during curing or it could be selected so that it would change to the desired color for aesthetics. Those skilled in the art will realize that some optimization of adhesive viscosity and groove geometry/size to yield the best performance in given a manufacturing fast cycle time production situation will be required and that the details of such optimization will be dependent on the individual manufacturing process. The result of Method A is a glass article having a preformed edge material, a bumper adhesively bonded to the edges of the article.

In Method B the same detailed descriptions apply as in concept "A" with the exception that the pre-formed edge material acts as a mold and will be made of a material or contain an additional material, for example a mold release material, that facilitates release (separation) of the mold from the injected material after the injected material has been cured. Specifically, once the injected material has cured, the edge mold material can be pulled off or removed without sticking to the newly formed and cured bumper, or causing any material defects to it that would cause the article to be rejected, for example, any separation of the newly formed bumper from the glass. The final assembly will consist of glass and cured injected material acting as the bumper.

While typical embodiments have been set forth for the purpose of illustration, the foregoing description should not be deemed to be a limitation on the scope of the disclosure or the appended claims. Accordingly, various modifications, adaptations, and alternatives may occur to one skilled in the art without departing from the spirit and scope of this disclosure or the appended claims.

We claim:

1. A method of forming an edge protection or bumper about the edge(s) of a glass article, the method comprising:
   providing a glass article having a first and second face and an edge(s),
   setting the glass article in a fixture,
   placing an edge material around the edge(s) of the glass, the edge material being formed such that a cavity exists between the glass edge(s) and the edge material, wherein the cavity is defined by the glass edge(s) and the edge material,
   injecting an adhesive into the cavity between the edge(s) of the glass and the edge material, and venting the air in the cavity,
   curing the adhesive to thereby bond the edge material to the glass edge(s), and
   removing the edge protected glass article from the fixture, wherein the adhesive does not contact the first and second faces of the glass article.

2. The method according to claim 1, wherein the adhesive is thermally cured.

3. The method according to claim 1, wherein the adhesive is UV radiation cured.

4. The method according to claim 1, wherein the glass article comprises an area under compressive stress and an area under central tension, and wherein the area under central tension includes the glass edge(s).

5. A method of forming an edge protection or bumper about the edge(s) of a glass article, the method comprising:
   providing a glass article having a first and second face and an edge(s),
   setting the glass article in a fixture,
   placing an edge material around the edge(s) of the glass, the edge material being formed such that a cavity exists between the glass edge(s) and the edge material, wherein the cavity is defined by the glass edge(s) and the edge material,
   injecting an adhesive into the cavity between the edge(s) of the glass and the edge material, and venting the air in the cavity, using an injection device having a needle with a first channel and a second channel to inject the adhesive into the cavity through the first channel and vent the air in the cavity through the second channel,
   curing the adhesive to thereby bond the edge material to the glass edge(s), and
   removing the edge protect glass article from the fixture.

6. The method according to claim 1, wherein the edge material has at least one opening exposed to the cavity and wherein the venting comprises expelling the air in the cavity through the at least one opening in the edge material.

7. The method according to claim 5, wherein the adhesive is thermally cured.

8. The method according to claim 5, wherein the adhesive is UV radiation cured.

9. The method according to claim 5, wherein the glass article comprises an area under compressive stress and an area under central tension, and wherein the area under central tension includes the glass edge(s).

10. The method according to claim 5, wherein the edge material has at least one opening exposed to the cavity and wherein the venting comprises expelling the air in the cavity through the at least one opening in the edge material.

* * * * *